United States Patent [19]
Lemieux et al.

[11] Patent Number: 5,989,451
[45] Date of Patent: Nov. 23, 1999

[54] COMPOUNDS AND METHODS FOR DOPING LIQUID CRYSTAL HOSTS

[75] Inventors: Robert P. Lemieux; Liviu Dinescu, both of Kingston, Canada

[73] Assignee: Queen's University at Kingston, Kingston, Canada

[21] Appl. No.: 09/020,110

[22] Filed: Feb. 6, 1998

Related U.S. Application Data

[60] Provisional application No. 60/037,497, Feb. 7, 1997, and provisional application No. 60/059,901, Sep. 24, 1997.

[51] Int. Cl.$^6$ .......................... C09K 19/60; G02F 1/137; C07D 333/64; F21V 9/14
[52] U.S. Cl. .................................... 252/299.1; 252/299.2; 252/582.585; 349/196; 549/53; 549/54; 549/55; 549/56
[58] Field of Search .............................. 252/299.1, 299.2, 252/582, 585; 349/196; 549/53, 54, 55, 56

[56] References Cited

U.S. PATENT DOCUMENTS

| | | |
|---|---|---|
| 4,712,874 | 12/1987 | Sekimura et al. . |
| 4,778,619 | 10/1988 | Wakemoto et al. .................. 252/299.1 |
| 5,026,505 | 6/1991 | Kaneko et al. . |
| 5,078,475 | 1/1992 | Sekimura et al. . |
| 5,118,586 | 6/1992 | Hattori et al. . |
| 5,212,575 | 5/1993 | Kojima et al. . |
| 5,240,797 | 8/1993 | Matsushima et al. . |
| 5,242,558 | 9/1993 | Matsushima et al. . |
| 5,278,009 | 1/1994 | Iida et al. . |
| 5,296,952 | 3/1994 | Takatsu et al. . |
| 5,364,668 | 11/1994 | Takimoto et al. . |
| 5,368,991 | 11/1994 | Uchikawa et al. . |
| 5,395,678 | 3/1995 | Matsushima et al. . |
| 5,443,864 | 8/1995 | Takimoto et al. . |
| 5,461,494 | 10/1995 | Sekimura et al. . |
| 5,486,442 | 1/1996 | Takimoto et al. . |
| 5,486,936 | 1/1996 | Fujikake et al. . |
| 5,520,855 | 5/1996 | Ito et al. . |
| 5,602,660 | 2/1997 | Sekimura et al. . |
| 5,650,867 | 7/1997 | Kojima et al. . |

FOREIGN PATENT DOCUMENTS

| | | |
|---|---|---|
| 0 199 111 A2 | 10/1986 | European Pat. Off. . |
| 62-167360 | 7/1987 | Japan . |
| 62-167389 | 7/1987 | Japan . |

OTHER PUBLICATIONS

Collins–Gold, L., et al., "Interfacial effects on excited–state potential energy surfaces. Interrelationship between photo-reactivity and surface properties", *Langmuir* 2:191–194 (1986).

Dinescu, L. et al., "Modulating the spontaneous polarization of a ferroelectric liquid crystal via the photoisomerization of a chiral thioindigo dopant: (R,R)–6, 6'–bis(1–methylheptyloxy)thioindigo", *Liq. Cryst.*, 20:741–749 (1996).

Dinescu, L. et al., "Photomodulating the spontaneous polarization of a ferroelectric liquid crystal phase using chiral thioindigo dopants", *SPIE* vol. 3015·0277–786X/97.

(List continued on next page.)

*Primary Examiner*—Shean Wu
*Attorney, Agent, or Firm*—Stephen J. Scribner; Carol Miernicki Steeg

[57] ABSTRACT

This invention provides chiral thioindigo compounds for doping smectic liquid crystal hosts, wherein the compounds modulate a chiral bulk property of an induced chiral smectic liquid crystal phase upon irradiation at a wavelength in the visible range. Modulation of the chiral bulk property is effected by reversible trans-cis photoisomerization of the compound upon irradiation. The compounds maintain their rod-like shape in both isomeric forms, and hence do not destabilize the chiral smectic liquid crystal phase. Compounds according to the invention are useful in optical devices such as optical switches, displays, and memory.

25 Claims, 9 Drawing Sheets

OTHER PUBLICATIONS

Dinescu, L. et al., "Photomodulation of the spontaneous polarization of a ferroelectric liquid crystal: harnessing the transverse dipole modulation of a chiral thioindigo dopant", *J. Am. Chem. Soc.*, 119:8111–8112 (1997).

Poths, H. et al., "From monomeric to polymeric ferroelectric liquid crystals. A comparative study of ferroelectric properties", *Liq. Cryst.* 18:811–818 (1995).

Ross, D.L. "Photochromic indigoids. III: A photochromic element based on the cis–trans photoisomerization of a thioindigo dye", *Appl. Optics* 10:571–576 (1971).

Wakemoto, H. et al. "Optically active thioindigo dyes for liquid crystals", Abstract, *Chem. Abstr.* 108:7503y (1988).

Wakemoto, H. et al. "Liquid crystal composition containing thioindigo dyes", Abstract, Chem. Abstr. 108:46959w (1988).

Walba, D.M. et al., "Design and synthesis of new ferroelectric liquid crystals. 14. An approach to the stereocontrolled synthesis of polar organic thin films for nonlinear optical applications", *J. Am. Chem. Soc.*, 113:5471–5474 (1991).

Walba, D.M. et al., "Main–chain ferroelectric liquid crystal oligomers by acyclic diene metathesis polymerization", *J. Am. Chem. Soc.* 118:2740–2741 (1996).

Walba, D.M. et al., "An approach to the design of ferroelectric liquid crystals with large second order electronic nonlinear optical susceptibility", *Mol. Cryst. Liq. Cryst.*, 198:51–60 (1991).

Walba, D.M. et al., "Ferroelectric liquid crystals for nonlinear optics: orientation of the disperse red 1 chromophore along the ferroelectric liquid crystal polar axis", *J. Am. Chem. Soc.*, 118:1211–1212 (1996).

Whitten, D.G., "Photochemical reactions in organized monolayer assemblies. I. Cis–trans isomerization of thioindigo dyes", *J. Am. Chem. Soc.* 96:594–596 (1974).

WPIDS 87–245995, 1987.

WPIDS 87–245972, 1987.

COMPOUNDS AND METHODS FOR DOPING LIQUID CRYSTAL HOSTS

REFERENCE TO RELATED APPLICATIONS

This application claims the benefit of U.S. Provisional Applications No. 60/037,497, filed Feb. 7, 1997, and Ser. No. 60/059,901, filed Sep. 24, 1997.

FIELD OF THE INVENTION

This invention relates generally to dopants for liquid crystal hosts, and in particular to chiral thioindigo dopants for smectic liquid crystal hosts.

BACKGROUND OF THE INVENTION

Ferroelectric liquid crystals (FLCs) are potentially useful as the active component in optoelectronic and photonic devices such as optical switches, displays, and spatial light modulators. To be useful in such applications, switching of an FLC, i.e., control of its light-transmitting properties, must be possible. One approach is to dope the liquid crystal with a photochromic compound that produces a reversible photomechanical effect, i.e., a structural change of the liquid crystal phase, in response to irradiation with light of a specific wavelength. The structural change of the liquid crystal phase changes the light-transmitting properties of the liquid crystal. For example, U.S. Pat. No. 5,118,586 to Hattori et al., issued Jun. 2, 1992, proposes the use of a photochromic dopant to achieve such switching in a liquid crystal film, for photorecording of digital information. Irradiation of the aligned liquid crystal film in the ultra-violet (UV) range causes a change in the birefringence of the liquid crystal phase as shown by the rotation of plane-polarized light transmitted through the material. The initial state can be restored by irradiating the film with visible light. As shown by Hattori et al., this principle can be applied to a FLC using a fulgide dopant, in which case the irradiation merely modulates the birefringence of the liquid crystal phase in the absence of an electric field. However, the resulting rotation of plane-polarized light is very small, on the order of 0.2 degree, which is not enough to produce a sufficient contrast in some optoelectronic and photonic applications.

A different approach which may be useful for applications such as optical switches and displays involves a system employing a photoactive chiral dopant in an achiral smectic $C(S_C)$ liquid crystal host (i.e., a liquid crystal phase which exhibits molecular ordering and a molecular tilt) to give an induced FLC. In principle, upon irradiation of the resulting chiral smectic $C(S_C^*)$ phase, switching can be achieved via modulation of the spontaneous polarization ($P_S$; a chiral bulk property of the FLC) above and below a switching threshold, to change the light-transmitting properties of the FLC. Modulation of $P_S$ is associated with a photo-induced structural change in the dopant.

Recently it has been shown that $P_S$ can be photomodulated in the near-UV range via the reversible trans-cis photoisomerization of chiral azobenzene dopants in $S_C$ or $S_C^*$ liquid crystal hosts (Negishi et al., *Chem. Lett.*, 319, 1996; Blinov et al., *Jap. J. Appl. Phys.*, 35:5405, 1996; Sasaki et al., *J. Phys. Chem.*, 99:13013, 1995; Walton et al., *Liq. Cryst.*, 17:333, 1994; Sasaki et al., *J. Am. Chem. Soc.*, 116:625, 1994; Ikeda et al., *Nature*, 361:428, 1993) and of azobenzene side-chain-doped copolymer FLCs (Öge et al., *Macromol. Chem. Phys.*, 197:1805, 1996). In this system, the modulation of $P_S$ arises from a photomechanical effect associated with the change in shape of the azobenzene dopant from rod-like (trans) to bent (cis): the change to the bent cis-isomer destabilizes the $S_C^*$ phase of the liquid crystal and decreases polar ordering, thus decreasing $P_S$. The photomechanical effect results in significant decreases in the temperature of phase transition between chiral smectic $A(S_A^*)$ (i.e., a smectic liquid crystal phase having the same molecular ordering as a $S_C^*$ phase, but without a molecular tilt) and $S_C^*$ phases or between chiral nematic (N*) (i.e. a liquid crystal phase having orientational ordering only) and $S_C^*$ phases, producing in some cases a complete loss of polarization due to an isothermal phase transition to the $S_A^*$ or N* phase.

Thus, while the above system has demonstrated photomodulation of $P_S$, there are significant disadvantages to that approach: (i) the addressing wavelength causing trans-to-cis photoisomerization of the azobenzene dopant is in the near-ultraviolet range (365 nm), which is undesirable for practical applications for which an inexpensive addressing light source is preferred; and (ii) the mechanical destabilization of the $S_C^*$ phase can produce a more fluid, less ordered nematic phase with lower structural integrity, which may be a severe impediment if the FLC film is to be used as a long-term digital information storage device.

OBJECT OF THE INVENTION

It is an object of the invention to provide chiral dopants for a smectic liquid crystal host, which dopants modulate chiral bulk properties of an induced chiral smectic phase upon irradiation in the visible range, without concomitant destabilization of the chiral smectic liquid crystal phase.

SUMMARY OF THE INVENTION

According to a broad aspect, this invention provides chiral thioindigo compounds for doping smectic liquid crystal hosts, wherein the compounds modulate a chiral bulk property of an induced chiral smectic liquid crystal phase upon irradiation at a wavelength in the visible range, without destabilizing the chiral smectic liquid crystal phase. According to the invention, the modulation is effected by cis to trans photoisomerization of the chiral thioindigo compounds upon irradiation, wherein the photoisomerization is reversible, the absorptivity of the cis and trans isomers is at different wavelengths so that the two isomers can be addressed at different wavelengths without overlap; and the absorptivity of the cis and trans isomers in the visible range.

Chiral thioindigo compounds of the invention are represented by general formula I, wherein: $R^1$ and $R^2$ may be the same or different from each other and may be, for example, hydrogen, fluoro, chloro, bromo, iodo, nitro, nitrile, alkyl, alkenyl alkoxy, hydroxy, perfluoroalkyl, thioalkyl or the like; and $R^3$ and $R^4$ may be the same or different from each other and at least one of $R^3$ and $R^4$ is a chiral side-chain with at least one chiral center that is coupled, via steric and/or dipole-dipole interactions, to the thioindigo core. In some embodiments, one of $R^3$ and $R^4$ is an oligosiloxane side-chain, and the other of $R^3$ and $R^4$ is an a chiral side-chain with at least one chiral center that is coupled, via steric and/or dipole-dipole interactions, to the thioindigo core.

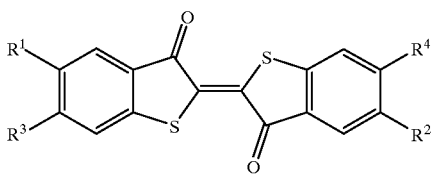

(I)

According to a preferred embodiment, the compound is (R,R)-5,5'-dinitro-6,6'-bis(2-octyloxy)thioindigo, or a derivative or analogue thereof. According to a more preferred embodiment, the compound is (R,R)-5,5'-dichloro-6,6'-bis(2-octyloxy)thioindigo, or a derivative or analogue thereof According to another aspect of the invention, a chiral thioindigo compound as described above may be dispersed in a liquid crystal host such as an achiral smectic $C(S_C)$ liquid crystal, a chiral smectic $C(S_C^*)$ liquid crystal, an achiral smectic $A(S_A)$ liquid crystal, a chiral smectic $A(S_A^*)$ liquid crystal, or a polymeric smectic liquid crystal such as a smectic polysiloxane liquid crystal.

By a further aspect, the invention provides a method of synthesizing (R,R)-5,5'-dinitro-6,6'-bis(2-octyloxy) thioindigo, comprising the steps of: conducting a Mitsunobu inversion reaction to produce a chiral methyl 2-chlorobenzoate precursor; reacting the chiral methyl 2-chlorobenzoate precursor with methyl thioglycolate to produce a chiral bicyclic enol ester; performing base-catalyzed hydrolysis and decarboxylation of the chiral bicyclic enol ester to produce a chiral benzothiophenone; and oxidizing the chiral benzothiophenone to obtain (R,R)-5,5'-dinitro-6,6'-bis(2-octyloxy)thioindigo. Preferably the oxidizing step is performed without prior isolation of the chiral benzothiophenone.

By a further aspect, the invention provides to a method of synthesizing (R,R)-5,5'-dichloro-6,6'-bis(2-octyloxy) thioindigo, comprising the steps of: conducting a Mitsunobu inversion reaction to produce a chiral methyl 2-fluorobenzoate precursor; reacting the chiral methyl 2-chlorobenzoate precursor with methyl thioglycolate to produce a chiral bicyclic enol ester; conducting a base-catalyzed hydrolysis and decarboxylation of the chiral bicyclic enol ester to produce chiral benzothiophenone; and oxidizing the chiral benzothiophenone to obtain (R,R)-5,5'-dichloro-6,6'-bis(2-octyloxy)thioindigo. Preferably the oxidizing step is performed without prior isolation of the chiral benzothiophenone.

The invention also provides an optical device for operation with a direct current field, comprising: a liquid crystal host selected from the group consisting of an achiral smectic $C(S_C)$ liquid crystal host and a chiral smectic $C(S_C^*)$ liquid crystal host; and a chiral thioindigo compound dispersed in the liquid crystal host to produce a chiral smectic $C(S_C^*)$ liquid crystal phase across which the field is applied, the chiral compound, upon irradiation in the visible range, modulating a spontaneous polarization of the liquid crystal phase without destabilization of the liquid crystal phase.

According to another embodiment, the invention provides an optical device for operation with a direct current field, comprising: a liquid crystal host selected from the group consisting of an achiral smectic $C(S_A)$ liquid crystal host and a chiral smectic $C(S_A^*)$ liquid crystal host; and a chiral thioindigo compound dispersed in the liquid crystal host to produce a chiral smectic C $(S_A^*)$ liquid crystal phase across which the field is applied, the chiral compound, upon irradiation in the visible range, modulating an electroclinic coefficient of the liquid crystal phase without destabilization of the liquid crystal phase.

In accordance with the invention such optical devices can be, for example, optical switches.

By another aspect, the invention provides a FLC optical switch for operation under an applied direct current field, comprising: a smectic C liquid crystal host; a chiral photochromic compound dispersed in the liquid crystal host, the chiral compound inducing in the liquid crystal host polarization in a first polarity, and being capable of undergoing trans-cis isomerization upon irradiation in the visible range without destabilizing the liquid crystal; and a photochemically inert compound dispersed in the liquid crystal host, the inert compound inducing in the liquid crystal polarization in a second polarity; wherein the proportions of the chiral compound and the inert compound are such that the polarization induced by the inert compound is greater than that induced by a first isoform of the photochromic dopant, such that the total polarization of the liquid crystal is in the second polarity; and wherein, upon irradiation in the visible range, the polarization induced by the inert compound is less than that induced by the photochromic dopant in a second isoform, such that the total polarization of the liquid crystal is in the first polarity, resulting in a change in light transmission through the liquid crystal.

BRIEF DESCRIPTION OF THE DRAWINGS

Embodiments of the invention will now be described, by way of example, with reference to the accompanying drawings, wherein.

DETAILED DESCRIPTION OF THE INVENTION

According to a broad aspect of the invention, chiral thioindigo compounds are provided which are useful as dopants in a smectic liquid crystal host. Chiral thioindigo compounds of the invention undergo reversible trans-cis photoisomerization, which isomerization modulates a chiral bulk property of the host liquid crystal to trigger switching. The compounds of the invention maintain their rod-like shape in both isomeric forms, and hence do not destabilize the liquid crystal phase.

Chiral thioindigo dopants of the invention are therefore different from prior art chiral dopants such as azobenzene dopants, also used in smectic C liquid crystal hosts (Negishi et al., *Chem. Lett.*, 319, 1996; Blinov et al., *Jap. J. Appl. Phys.*, 35:5405, 1996; Sasaki et al., *J. Phys. Chem.*, 99:13013, 1995; Walton et al., *Liq. Cryst.*, 17:333, 1994; Sasaki et al., *J. Am. Chem. Soc.*, 116:625, 1994; Ikeda et al., *Nature*, 361:428,1993). Such chiral azobenzene dopants also undergo trans-cis photoisomerization upon irradiation; however, the photoisomers change between a rod-like shape and a bent shape, which change in shape destabilizes the liquid crystal phase. Moreover, the prior art dopants undergo isomerization in the near-UV range, whereas the compounds of the invention undergo isomerization in the visible range. As UV light sources are substantially more expensive than visible light sources, the use of visible wavelengths with the inventive compounds is an advantage.

In accordance with a broad aspect of the invention, chiral thioindigo compounds are provided which are useful as dopants in a smectic C liquid crystal host. Chiral thioindigo dopants of the invention induce a ferroelectric chiral (*) smectic C($S_C^*$) phase, and a spontaneous polarization ($P_S$; a chiral bulk property of the liquid crystal host) in the resulting ferroelectric phase. Upon irradiation in the visible range of wavelengths, of a $S_C^*$ liquid crystal phase doped with a compound of the invention, $P_S$ is modulated via a photo-induced isomerization of the dopant. Switching of the FLC between opposite tilt orientations (i.e. Goldstone-mode switching) is achieved via modulation of $P_S$ above or below a switching threshold, causing a polarization reversal of $P_S$. The polarization reversal results in a rotation of plane-polarized light transmitted through the FLC, and hence in a change in the light-transmitting properties of the liquid crystal. The switching threshold is set by, for example, a direct current field applied across the FLC, and can therefore be adjusted to suit specific applications. Moreover, an FLC according to the invention is bistable, as switching of the FLC only occurs while the DC field is applied, and the FLC retains its state in the absence of any applied field.

Figure 1:
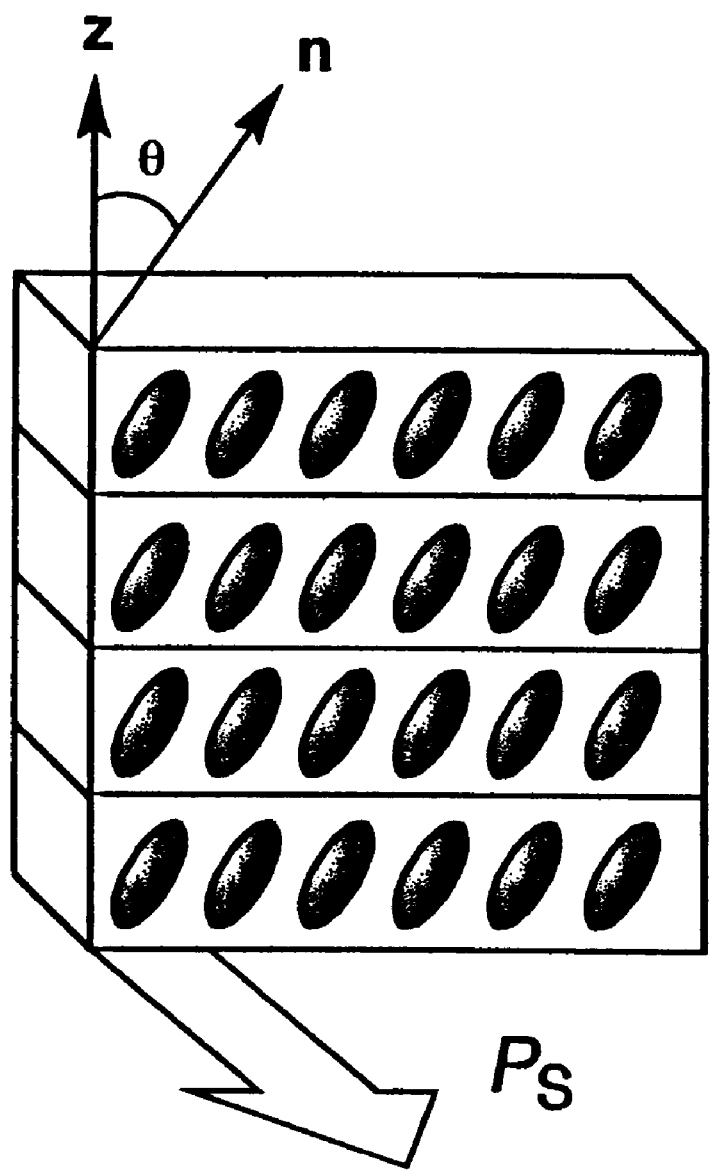
FIG. 1 is a diagrammatic representation of spontaneous polarization of an FLC.

Spontaneous polarization is intrinsic to the FLC. It is a permanent macroscopic dipole moment oriented along the axis perpendicular to the tilt plane solar axis), which is defined by the orientation of the molecular long axis n (director) and the layer normal z, as shown in FIG. 1. The spontaneous polarization is a macroscopic manifestation of molecular chirality and is a function of the molecular structure of the chiral dopant in the induced $S_C^*$ phase. In order for a polar functional group in the chiral dopant to contribute to $P_S$, it must (i) have a component of its dipole moment vector oriented along the polar axis, and (ii) be coupled to the chiral center(s) via steric and/or dipole-dipole interactions.

In accordance with another broad aspect of the invention, chiral thioindigo compounds are provided which are useful as dopants in a smectic A liquid crystal host. In such a host, the chiral thioindigo dopants of the invention induce a chiral smectic ($S_A^*$) phase exhibiting an electroclinic effect (i.e., an induced molecular tilt orientation) with an electroclinic coefficient ($e_c$; a chiral bulk property of the liquid crystal host). Upon irradiation in the visible range of wavelengths, of a $S_A^*$ liquid crystal phase doped with a compound of the invention, switching is triggered via modulation of $e_c$. The modulation of $e_c$ is associated with a photo-induced isomerization of the dopant. When a direct current field is applied across the liquid crystal, the isomerization triggers a change in the induced molecular tilt orientation of the $S_A^*$ phase. This results in a change in the light-transmitting properties of the liquid crystal, caused by a rotation of plane-polarized light transmitted through the liquid crystal.

Figure 2:
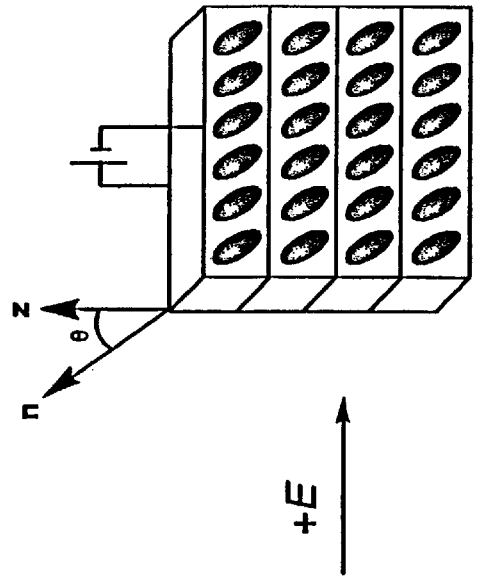
FIG. 2 is a diagrammatic representation of switching in a $S_A^*$ liquid crystal phase via an electroclinic effect.
Figure 2:
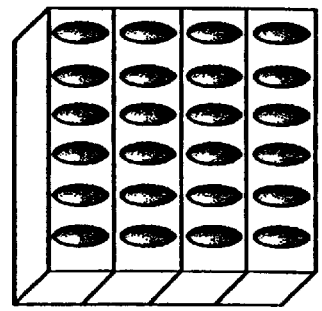
Figure 2:
Figure 2:
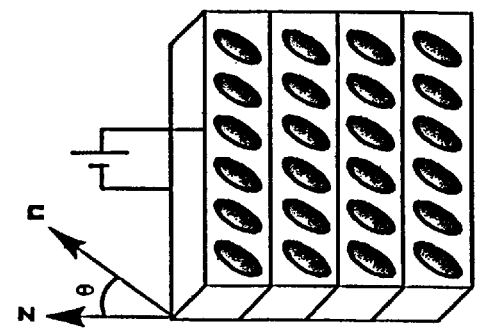

$S_A^*$ liquid crystals exhibit an electroclinic effect wherein application of an electric field across the liquid crystal induces a molecular tilt θ that is a linear function of the applied field E, as shown in FIG. 2 (Garoff et al., *Phys. Rev. A*, 19:338, 1979). The electroclinic coefficient $e_c$ is defined by the following equation:

$$e_c = \mu[\alpha(T-T_c)]^{-1}$$

wherein α is the first constant in the Landau free-energy expansion, $T-T_c$ is the reduced phase transition temperature, and μ is a structural coefficient characteristic of the chiral component of the $S_A^*$ phase (Andersson et al., *Ferroelectrics*, 84:285, 1988). Spatial light modulators based on the electroclinic effect are capable of continuous intensity modulation with a response time about 100 times faster than a FLC switch, although they lack bistability.

The invention contemplates modulating the electroclinic coefficient $e_c$ of a $S_A^*$ liquid crystal phase by transverse dipole modulation of a chiral photochromic dopant of the invention such as, for example, III. At a constant field E, photomodulation of $e_c$ would result in a change in induced tilt angle θ that can be detected as a change in light transmission between crossed polarizers.

As used herein, the term "switching" means a polarization reversal of P, in the case of $S_C^*$ liquid crystal phases, and a change in the field-induced molecular tilt angle in the case of $S_A^*$ liquid crystal phases, whereby the switching effects a change in the light-transmitting properties of the liquid crystal. In the case of $S_C^*$ liquid crystal phases, modulation of $P_S$ triggers the switching, whereas in the case of $S_A^*$ liquid crystal phases, modulation of $e_c$ triggers the switching. In both cases, the modulation is achieved by photoisomerization of a chiral thioindigo compound of the invention dispersed in the liquid crystal phase.

In principle, in a $S_A^*$ liquid crystal phase, a photoinduced change in tilt angle (Δθ) can be tuned (i.e., adjusted) by controlling the cis:trans ratio of the chiral thioindigo dopant present in the liquid crystal at the photostationary state by, for example, irradiating the liquid crystal with a writing beam of variable wavelength.

In general, an electroclinic liquid crystal optical switch according to the invention is tunable, has sub-microsecond response time, and is not bistable. In contrast, a FLC optical switch is substantially untunable, has a response time that is about 100 times slower, and is bistable. The two devices therefore lend themselves to distinctly different applications as will be apparent to one skilled in the art. Typical examples of applications of a FLC optical switch according to the invention are discussed below. An electroclinic optical switch according to the invention is particularly useful in applications such as, for example, a holographic interconnect for optical communication networks.

In general, chiral thioindigo dopants according to the invention can be effective photoactive components of electro-optical devices such as, for example, FLC and electroclinic optical switches, as the dopants undergo trans-cis photoisomerization in $S_A$ and $S_C$ phases, and they are highly miscible in a liquid crystal host. In addition, chiral side-chains of the compounds of the invention are strongly coupled to the thioindigo core, such that the photoinduced change in transverse dipole moment is as high as possible.

By one aspect, this invention provides chiral thioindigo compounds represented by the general formula I. In a preferred embodiment corresponding to (R,R)-5,5'dinitro-6,6'-bis(2-octyloxy)thioindigo, shown in formula II, $R^1$ and $R^2$ are $NO_2$, and $R^3$ and $R^4$ are (R)-2-octyloxy. In a more preferred embodiment corresponding to (R,R)-5,5'-dichloro-6,6'-bis(2-octyloxy)thioindigo, shown in formula III, $R^1$ and $R^2$ are Cl, and $R^3$ and $R^4$ are 2-octyloxy.

Compounds of the invention are not limited to the above preferred embodiments and in other embodiments $R^1$ and $R^2$ may independently be, but are not limited to, hydrogen, fluoro, chloro, bromo, iodo, nitro, nitrile, alkyl, alkenyl, alkoxy, hydroxy, perfluoroalkyl, or thioalkyl. $R^3$ and $R^4$ may independently be any chiral side-chain with at least one chiral center that is coupled, via steric and/or dipole-dipole interactions, to the thioindigo core. For example, $R^3$ and $R^4$ can be, but are not limited to, any of the chiral side-chains shown in formula IV; that is, functionalities included in the chiral side-chain may be; alkyl, alkenyl, ether, epoxide,

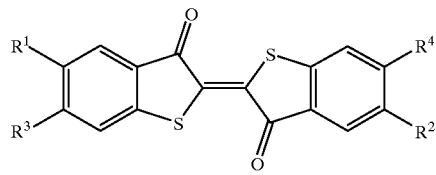

(I)

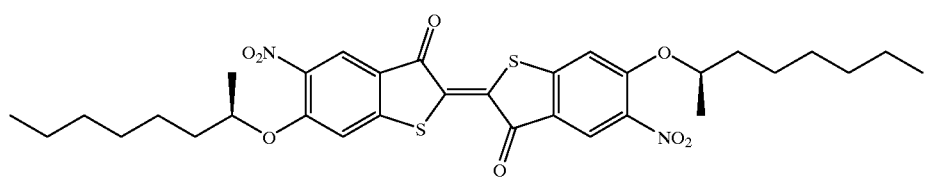

(II)

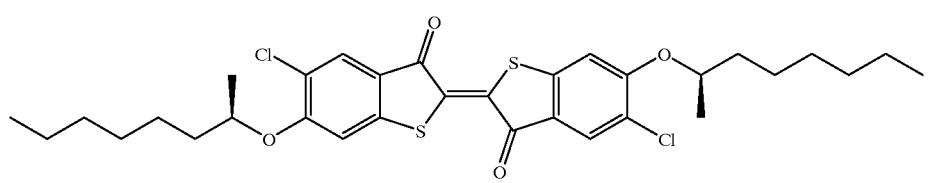

(III)

In the case of compound II of the invention, trans-to-cis photoisomerization is triggered by irradiation with light in the range of wavelengths from about 480 to about 550 nm and an Ar laser at 514 nm may conveniently be used. Isomerization back to the trans-isomer is triggered by irradiation in the range of about 400 to 480 nm. In the case of compound III of the invention, irradiation in the range of wavelengths from about 500 to 575 nm triggers trans-to-cis photoisomerization, and a Nd:YAG laser at 532 nm may conveniently be used. Isomerization back to the trans-isomer is triggered by irradiation in the range of about 400 to 500 nm. Of course, other wavelengths will be appropriate for other compounds according to the invention, but such other wavelengths will be within the range of about 400 to about 800 nm.

An increase in $P_S$ upon trans-cis photoisomerization of the dopants of the invention has been demonstrated up to 85% in the case of II, and up to 250% in the case of III. This effect results from a change in transverse dipole moment of the thioindigo core, which is strongly coupled to each chiral side-chain through the $R^1$ and $R^2$ substituents at the ortho position. The coupling function provided by the $R^1$ and $R^2$ substituents is critical in achieving the effect. This has been shown through previous work where, in the absence of ortho substituents, the chiral side-chains are decoupled from the core and trans-cis photoisomerization has virtually no effect on $P_S$ (Dinescu et al., *Liq. Cryst.*, 20:741–749, 1996). Measurement of the ferroelectric properties and $P_S$ photomodulation of the preferred embodiments are described in Example 1.

ester, carbonyl, amide, aromatic, heterocyclic, halide, nitrile or the like.

(IV)

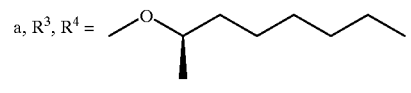

a, $R^3, R^4 =$

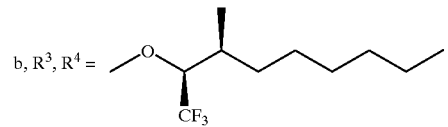

b, $R^3, R^4 =$

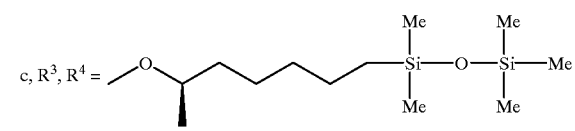

c, $R^3, R^4 =$

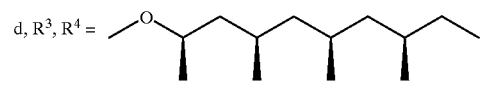

d, $R^3, R^4 =$

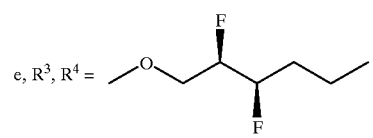

e, $R^3, R^4 =$

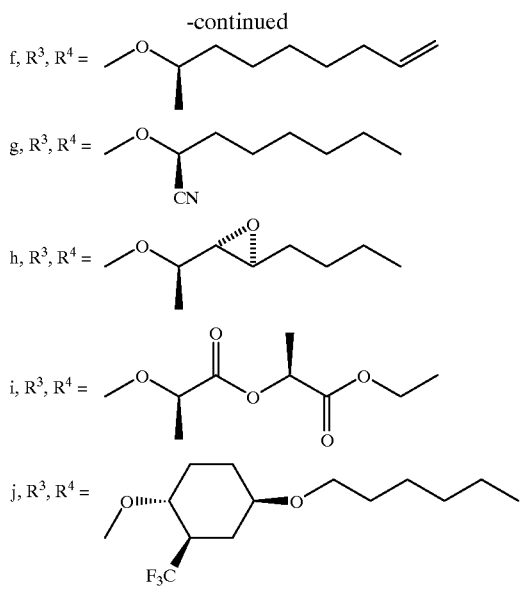

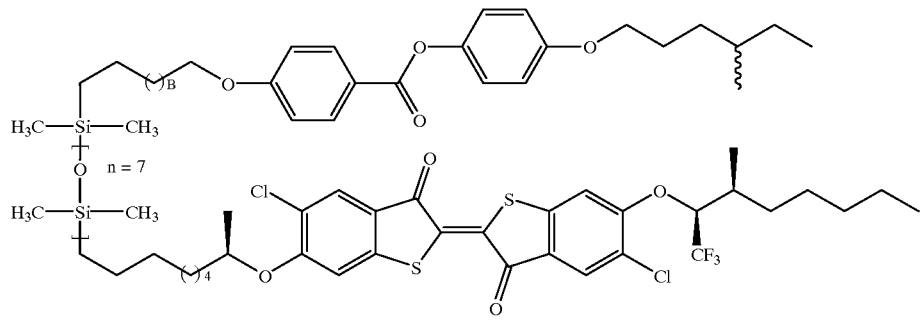

(V)

The invention contemplates additional compounds in which groups other than those listed above may be substituted for $R^1$ and $R^2$, and $R^3$ and $R^4$. For example, compounds of the invention include those having only a single chiral side chain at either of the $R^3$ and $R^4$ positions. Any such compound is considered to be within the scope of the invention, so long as the substitution of additional groups does not materially alter the photophysical properties of the thioindigo chromophore relative to those properties of the compounds of the preferred embodiments. The photophysical properties of chiral thioindigo compounds of the invention comprise: reversible photoisomerization; sufficiently different wavelengths of absorptivity of the cis and trans isomers so that the two isomers can be addressed at different wavelengths without overlap; and absorptivity of the cis and trans isomers in the visible range.

By another aspect, this invention pertains to use of chiral thioindigo compounds of the invention as dopants in achiral smectic $C(S_C)$ hosts and in achiral smectic $A(S_A)$ hosts. In these hosts, a chiral bulk property is induced by a chiral thioindigo compound of the invention. Chiral thioindigo compounds of the invention may also be used as dopants in chiral smectic $C(S_C^*)$ and chiral smectic $A(S_A^*)$ hosts, wherein the dopants alter a chiral bulk property in the host.

The $S_A$ and $S_C$ liquid crystals systems described above are monomeric and thus may be considered low molecular weight systems. However, the invention is not limited to such systems, and also encompasses use of chiral thioindigo compounds of the invention as dopants in polymeric $S_A$ and $S_C$ liquid crystal phases, which may be considered high molecular weight systems. According to this aspect of the invention, the compounds undergo $P_S$ or $e_c$ photomodulation via the same transverse dipole modulation mechanism as that described in the above monomeric systems. Thioindigo-doped polymeric liquid crystals are suitable for applications such as, for example, FLC and electroclinic optical switches. As high molecular weight systems, they have certain advantages over the above monomeric systems, such as: (i) higher mechanical stability and shock resistance; (ii) ability to be processed into flexible films; and (iii) good bistability in the absence of an applied field, thus making it unnecessary to maintain an electric field across the liquid crystal to maintain a particular state. The last point is particularly advantageous in applications such as optical storage of digital information, also encompassed by the invention.

In accordance with the invention, an example of a thioindigo dopant suitable for doping into a side-chain polysiloxane $S_C$ or $S_A$ liquid crystal is shown in formula V. The oligosiloxane side-chain of the compound in formula V increases the compatibility of the chiral thioindigo dopant with a side-chain polysiloxane $S_C$ or $S_A$ host.

It should be noted that any chiral thioindigo compound of the invention may be used as a dopant in any of the smectic liquid crystal hosts described above. Chiral side-chains of the compounds of the invention impart various degrees of mesogenicity and miscibility of the thioindigo compound in smectic hosts, and can affect the free volume for trans-cis photoisomerization. Accordingly, it is contemplated that chiral side-chains used in the compounds of the invention will be selected for compatibility with specific hosts and specific applications. A determination of a suitable chiral side-chain for a given host can be made without undue experimentation, by employing the procedures generally set forth herein. Compounds arising through such routine experimentation are considered to be within the scope of the present invention. Compound III of the invention is a preferred dopant because it exhibits very high solubility in a smectic liquid crystal host. For example, III has been dissolved in a phenyl benzoate (PhBz; (±)-4-(4-methylhexyloxy)phenyl 4-decyloxybenzoate) host at a concentration of 10 mol % with minimal destabilization of the $S_C$ liquid crystal phase. Compound II of the invention has been dissolved in PhBz at a concentration of 3 mol % with minimal destabilization of the $S_C$ liquid crystal phase. Of course, in each case, lower doping levels are also possible.

According to a further aspect of the invention, methods for synthesis of the compounds of the invention are provided. These methods are described in detail for the preferred embodiments II and III, respectively, in Examples 2 and 3, below. A method for synthesizing II may be summarized as comprising the steps of: conducting a Mitsunobu inversion reaction to produce a chiral methyl 2-chlorobenzoate precursor; reacting the chiral methyl 2-chlorobenzoate precursor with methyl thioglycolate to produce a chiral bicyclic enol ester; performing base-catalyzed hydrolysis and decarboxylation of the chiral bicyclic enol ester to produce a chiral benzothiophenone; and oxidizing the chiral benzothiophenone to obtain (R,R)-5,5'-dinitro-6,6'-bis(2-octyloxy)thioindigo. Preferably the oxidizing step is performed without prior isolation of the chiral benzothiophenone.

A method for synthesizing III may be summarized as comprising the steps of: conducting a Mitsunobu inversion reaction to produce a chiral methyl 2-fluorobenzoate precursor; reacting the chiral methyl 2-fluorobenzoate precursor with methyl thioglycolate to produce a chiral bicyclic enol ester; conducting a base-catalyzed hydrolysis and decarboxylation of the chiral bicyclic enol ester to produce chiral benzothiophenone; and oxidizing the chiral benzothiophenone to obtain (R,R)-5,5'-dichloro-6,6'-bis(2-octyloxy)thioindigo. Preferably the oxidizing step is performed without prior isolation of the chiral benzothiophenone.

Figure 3:
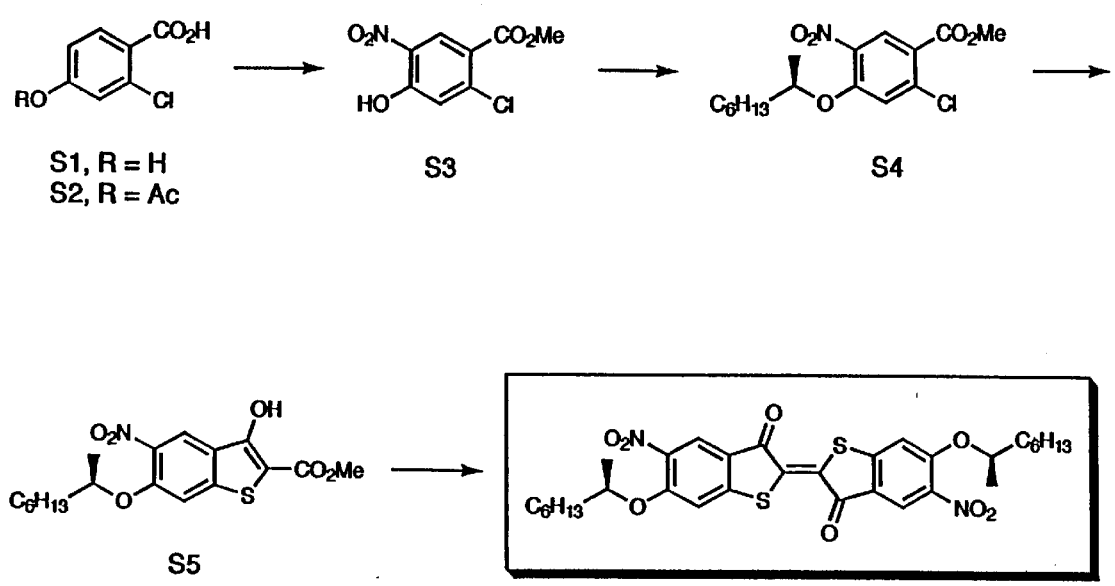
FIG. 3 is a diagram of a synthetic process for a nitro-substituted chiral thioindigo dopant according to the invention.
Figure 4:
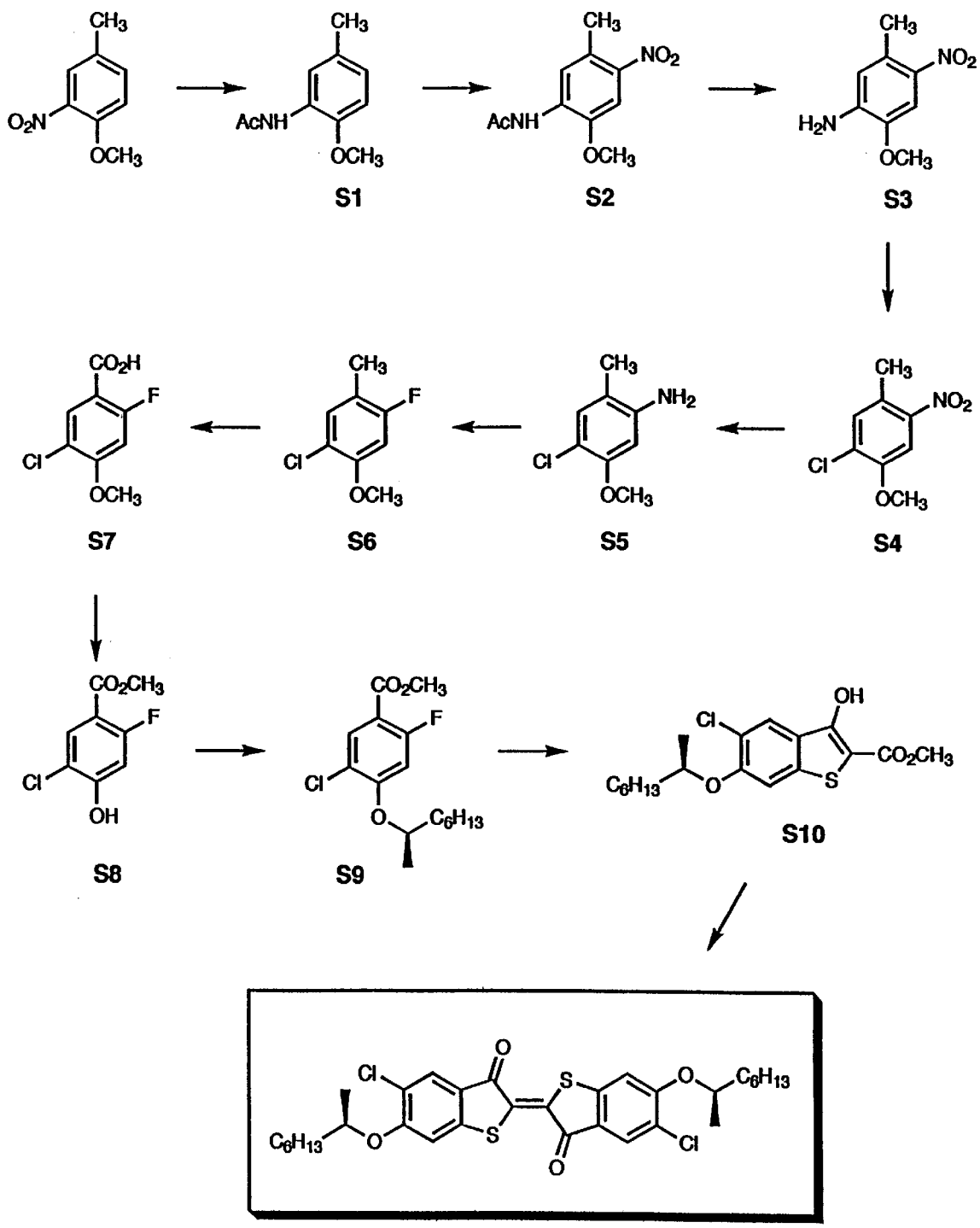
FIG. 4 is a diagram of a synthetic process for a chloro-substituted thioindigo dopant according to the invention.

It should be noted that the chiral bicyclic enol ester, shown as S5 in FIG. 3 or S10 in FIG. 4, which is a precursor to II and III as well as to analogues and derivatives of II and III, is a very stable compound and hence may advantageously be prepared in advance of the actual synthesis of the chiral thioindigo dopants, and stored and/or shipped.

Example 3 also describes a process for preparing chiral thioindigo compounds with $R^1$ different from $R^2$ and/or $R^3$ different from $R^4$ (see formula I). Such "unsymmmetrical" compounds are precursors in the synthesis of chiral thioindigo dopants with oligosiloxane side-chains such as V, described above. Methods for preparing chiral thioindigo-doped polymeric liquid crystals according to the invention are generally described in Example 4. Those skilled in the art will recognize that it is possible to make various modifications to the synthetic procedures of Examples 2 to 4 and still arrive at the desired compounds, or analogues and derivatives thereof. Such modifications are intended to be within the scope of the invention.

Figure 7:
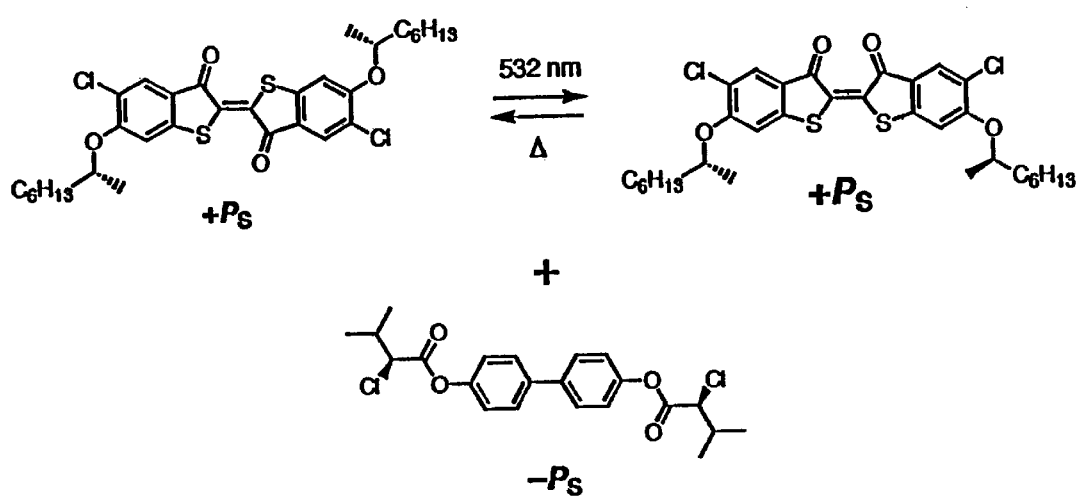
FIG. 7 is a diagrammatic representation of a $S_C^*$ liquid crystal optical switch wherein switching is via photoinduced polarization inversion.
Figure 7:
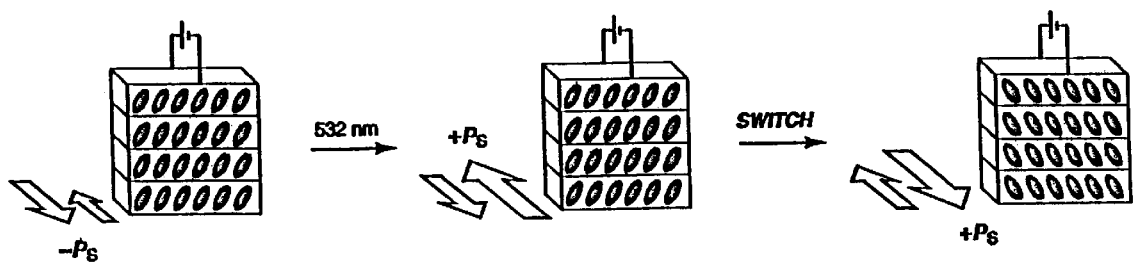

By a further aspect, the invention pertains to a FLC optical switch. The operation of a FLC optical switch according to the invention is based on a photoinduced sign reversal of the spontaneous polarization vector $P_S$, i e., a polarization inversion mechanism. As shown in FIG. 7, this can be achieved by mixing, in a smectic C liquid crystal host (e.g., PhBz), a photochromic dopant such as, for example, compound III of the invention, which induces a positive polarization, and a photochemically inert dopant (e.g., (S,S)-4,4'-bis[(2-chloro-3-methylbutanoyl)oxy]biphenyl), which induces a negative polarization. When mixed in the right proportions (e.g., a 2.3:1 ratio), the polarization induced by the inert dopant is greater than that induced by the photochromic dopant in the trans-form (i.e., $P_{ind}$(inert dopant) >$P_{ind}$(photochromic dopant)), and the total spontaneous polarization of the FLC optical switch is negative. Upon irradiation at an appropriate wavelength (e.g., 532 nm using a Nd:YAG laser for III), the polarization induced by the photochromic dopant increases to a level where $P_{ind}$(inert dopant)<$P_{ind}$(photochromic dopant), resulting in a reversal of the total spontaneous polarization from negative to positive. If this sign reversal occurs while the FLC cell is subjected to a static DC field (E), it results in a switching of the molecular tilt orientation (Goldstone-mode switching) that can be readily detected between crossed polarizers by virtue of a change in light transmission through the FLC cell. Moreover, because switching of the FLC will only occur while the DC field is applied, the FLC switch is inherently bistable. An FLC optical switch according to the invention therefore retains its state in the absence of any applied field, making it particularly advantageous in applications such as long-term optical storage devices. The principle of such a light switch according to the invention is described in detail in Example 5.

In accordance with the invention, an optical switch may be prepared using any of the chiral thioindigo dopants of the invention. For example, chiral thioindigo oligosiloxane compounds of the invention, such as V, may also be used, and the invention contemplates at least two different approaches for achieving $P_S$ photoinversion. A first approach is by intermolecular $P_S$ subtraction using a combination of chiral thioindigo dopants and non-photoactive chiral dopants which respectively induce polarizations in opposite directions. An example of this approach is represented by a compound according to formula VI.

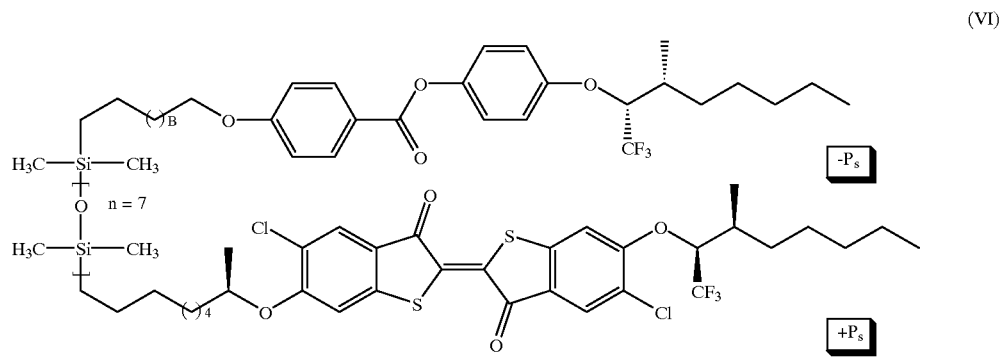

(VI)

A second approach contemplated by the invention is by intramolecular $P_S$ subtraction using a thioindigo dopant with chiral side-chains inducing polarizations in opposite directions, such as, for example, a compound according to general formula VII. An unsymmetrical thioindigo system such as this includes a chiral side-chain A with $-P_S$ that is decoupled from the thioindigo core, and a chiral side-chain B with $+P_S$ that is coupled to the thioindigo core through an ortho substituent. The side chains are selected so that the polarization induced by A is predominant with the thioindigo core in the trans form. Upon photoisomerization to the cis form, the polarization induced by side-chain A remains constant due to the lack of steric coupling to the core, whereas the polarization induced by the coupled side-chain B increases due to the added contribution of the thioindigo core. By selecting a suitable combination of chiral side-chains, this effect causes the polarization induced by B to predominate, resulting in $P_S$ inversion.

Low-resolution EI and CI mass spectra were recorded on a Fisons VG Quattro triple quadrupole mass spectrometer; peaks are reported as m/e (% intensity relative to the base peak). High-resolution EI mass spectra were performed by the University of Ottawa Regional Mass Spectrometry Center. UV-visible spectra were recorded on a Varian Cary 3 spectrophotometer in benzene. Melting points were measured on a Mel-Temp II melting point apparatus and are uncorrected.

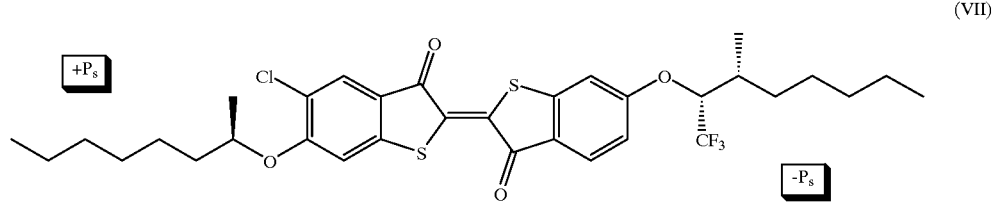

(VII)

The contents of all patent and scientific publications cited in this application are incorporated herein by reference.

EXAMPLE 1

Measurement of ferroelectric properties and $P_S$ photomodulation of II is described in Dinescu et al., *Proceedings of the SPIE-International Society for Optical Engineering*, 3015:16, 1997.

Measurement of ferroelectric properties and $P_S$ photomodulation of III was carried out as follows: Mixtures of III in PhBz were prepared over the mole fraction range $0.015 > x_4 > 0.07$, and $P_S$ and tilt angle ($\theta$) values were measured at a temperature 10° C. below the $S_{C^*}-S_{A^*}$ phase transition temperature ($T-T_{AC} = -10°$ C.). A plot of $P_S/\sin\theta$ vs $X_4$ gave a polarization power ($\delta_P$) value for III of +20.7 $nC/cm^2$. The spontaneous polarization of a 2.9 mol % mixture of III in PhBz at $T-T_{AC} = -10°$ C. was measured in the dark and upon irradiation with a Nd:YAG laser at 532 nm: $P_S$ (dark)=+0.92 $nC/cm^2$ and $P_S$ (532 nm)=+2.28 $nC/cm^2$.

Figure 6:
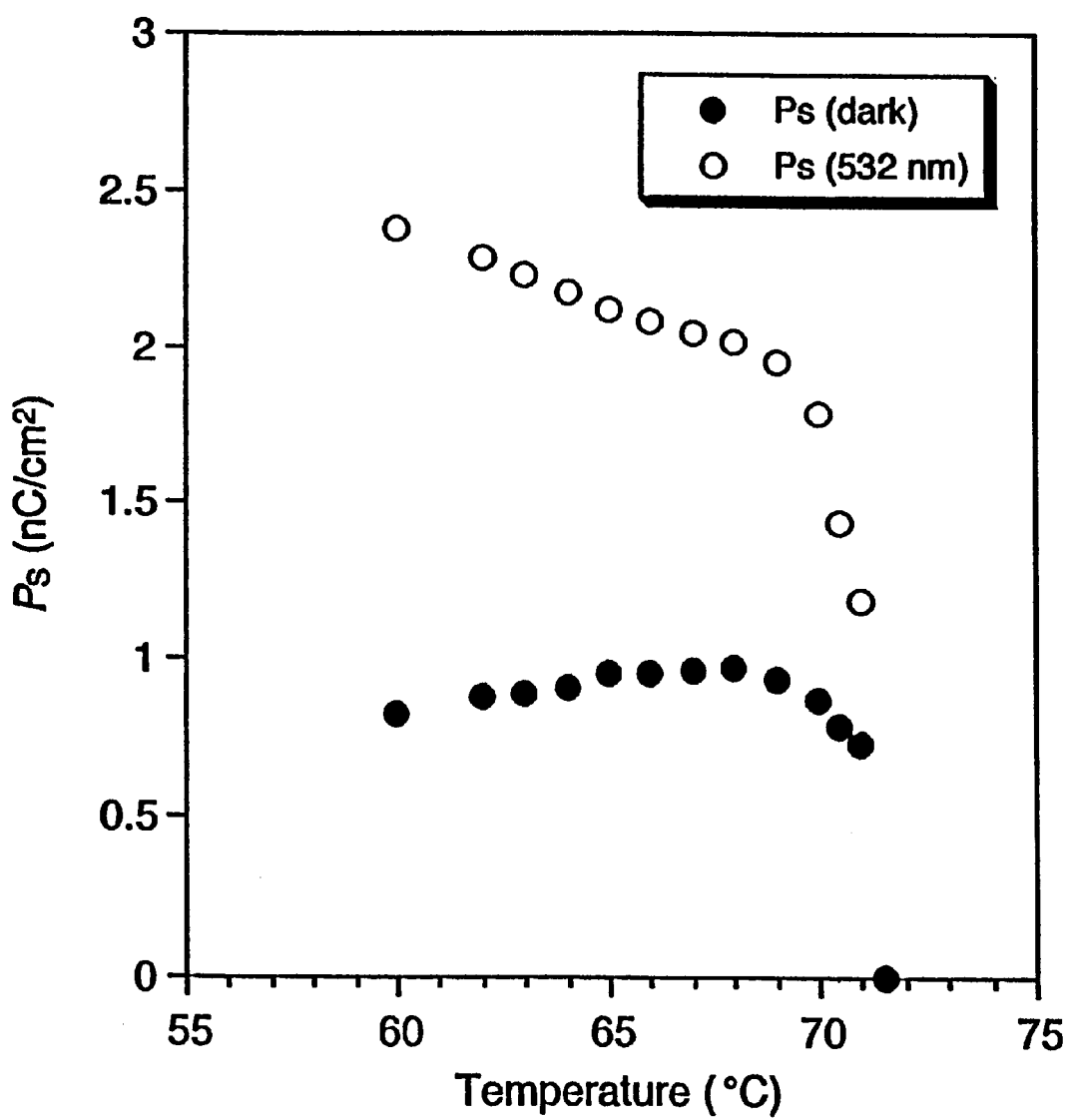
FIG. 6 is a plot of spontaneous polarization as a function of temperature for a FLC doped with the chloro-substituted chiral thioindigo compound of the invention.

To demonstrate that the above photomodulation takes place in the absence of any destabilization of the liquid crystal phase, $P_S$ was measured as a function of temperature with the sample in the dark and under constant irradiation at 532 nm. As shown in FIG. 6, the two curves can be extrapolated to the same $S_{C^*}-S_{A^*}$ phase transition temperature, thus suggesting that the photomodulation takes place without a photomechanical effect.

The photostability of II was verified as no decomposition of the dopant was apparent after 80 hours of continuous irradiation of a 2.6 mol % mixture in PhBz at a wavelength of 514 nm with an argon laser. Similarly, no decomposition of III was observed after 24 hours of continuous irradiation of the 2.9 mol % mixture in PhBz at 532 nm with a Nd:YAG laser.

EXAMPLE 2

Compound II of the invention was synthesized according to the procedure shown in FIG. 3, using intermediates having reference numerals S1 to S5. Intermediates S2 to S5 were synthesized as set forth below.

General. $^1$H and $^{13}$C NMR spectra were recorded on a Bruker ACF-200 NMR spectrometer in deuterated chloroform or deuterated acetone. The chemical shifts are reported in δ (ppm) relative to tetramethylsilane as internal standard.

Materials. All reagents were obtained from commercial sources and used without further purification unless otherwise noted. Dimethylformamide (DMF) was distilled from BaO under reduced pressure and stored over molecular sieves. Methylene chloride ($CH_2Cl_2$) was distilled from $P_2O_5$ under $N_2$. 2-Chloro-4-hydroxybenzoic acid (S1, FIG. 3) was prepared according to the procedure of Molnar et al. (*Helv. Chim. Acta*, 52:401, 1969), and shown to have the expected physical and spectral properties.

Methyl 2-chloro-4-hydroxy-5nitrobenzoate (S3).

A solution of S1 (1.55 g, 9.0 mmol) in acetic anhydride (5 ml) was heated on a steam bath for 30 min, then poured over ice and filtered in a Buchner funnel. The solid residue was washed with water and air dried to give 1.76 g of the acetoxy derivative S2. Without further purification, compound S2 was dissolved in a mixture of 95% $HNO_3$ (15 ml) and glacial acetic acid (15 ml) and stirred at room temperature for 24 h. The mixture was then concentrated, and the yellow residue was dissolved in a mixture of methanol (20 ml) and concentrated $H_2SO_4$ (0.5 ml) and refluxed overnight. After cooling, the mixture was poured into $H_2O$ and extracted with ether. The extracts were washed with $H_2O$, brine, then dried ($MgSO_4$) and concentrated. Purification by flash chromatography on silica gel (30% ethyl acetate/toluene) gave 0.64 g (31%) of S3 as a yellow solid: mp 94–95° C.; $^1$H NMR (200 MHz, acetone-$d_6$) δ 3.91 (s, 3H), 7.36 (s, 1H), 8.64 (s, 1H), 10.8 (s, OH); $^{13}$C NMR (50 MHz, acetone-$d_6$) δ 52.9, 122.3, 122.9, 130.0, 134.0, 142.3, 157.0, 164.1; MS (EI) m/e 233 (M+2, 6), 231 (M+, 18), 202 (35), 200 (100), 170 (5), 156 (15), 154 (38), 142 (8), 126 (13), 113 (6), 97 (12); HRMS (EI) calculated for $C_8H_6NO_5{}^{37}Cl$: 232.9905. Found: 232.9888.

Methyl (R)-2-chloro-4-(2-octyloxy)-5-nitrobenzoate (S4).

Under a $N_2$ atmosphere, diisopropylazodicarboxylate (DIAD, 202 mg, 0.99 mmol) was added dropwise to a stirred solution of S3 (153 mg, 0.66 mmol), triphenyl phosphine (260 mg, 0.99 mmol) and (S)-2-octanol (90 mg, 0.69 mmol) in dry $CH_2Cl_2$ (10 ml). After stirring at room temperature for 2 h, the solvent was removed in vacuo, and the oily residue was purified by flash chromatography on silica gel (30% ethyl acetate/toluene) to give 195 mg (86%) of S4 as a yellow oil: $^1$H NMR (200 MHz, $CDCl_3$) δ 0.87 (t, J=6.6 Hz, 3H), 1.20–1.80 (m, 10H), 1.38 (d, J=6.0 Hz, 3H), 3.92 (s, 3H), 4.56 (m, J=6.0 Hz, 1H), 7.10 (s, 1H), 8.45 (s, 1H); $^{13}$C NMR (50 MHz, CDCl$_3$) δ 14.0, 19.3, 22.5, 25.0, 29.0, 31.6, 36.0, 52.6, 77.6, 117.6, 120.5, 129.5, 138.0, 140.3, 154.0, 163.6; MS (CI) m/e 346 (M+3, 32), 344 (M+1, 100), 316 (22), 314 (67), 301 (13), 299 (36), 279 (17), 262 (35), 260 (96), 234 (25), 232 (69), 201 (6), 149 (4), 91 (16); HRMS (EI) calculated for $C_{15}H_{19}NO_4{}^{35}Cl$ (M–OCH$_3$): 312.1001. Found: 312.1004.

Methyl (R)-3-hydroxy-6-(2-octyloxy)-5-nitrobenzo[b]thiophene-2-carboxylate (S5)

Under a N$_2$ atmosphere, a mixture of S4 (197 mg, 0.57 mmol), anhydrous LiOH (48 mg, 2 mmol) and methyl thioglycolate (91 mg, 0.86 mmol) in dry DMF (10 ml) was stirred overnight at room temperature. The mixture was poured into H$_2$O (40 ml), acidified with 3M HCl and extracted with ethyl acetate. The combined extracts were washed with 1M HCl, brine, dried (MgSO$_4$) and concentrated to give a yellow oil. Purification by flash chromatography on silica gel (30% ethyl acetate/toluene) gave 135 mg (62%) of S5 as a yellow waxy solid: mp 54–55 ° C.; $^1$H NMR (200 MHz, CDCl$_3$) δ 0.87 (t, J=6.7 Hz, 3H), 1.24–1.80 (m, 10H), 1.39 (d, J=6.2 Hz, 3H), 3.95 (s, 3H), 4.54 (m, J=6.0 Hz, 1H), 7.26 (s, 1H), 8.31 (s, 1H), 10.1 (s, 1H); $^{13}$C NMR (50 MHz, CDCl$_1$) δ 14.0, 19.2, 22.6, 25.2, 29.1, 31.7, 36.1, 52.3, 77.0, 101.5, 107.8, 120.1, 122.3, 140.0, 143.5, 151.7, 159.2, 166.8; MS (CI) m/e 382 (M+1, 3), 270 (100), 232 (98), 212 (18), 202 (48), 149 (12), 113 (19); HRMS (EI) calculated for $C_{18}H_{23}NO_6S$: 381.1246. Found: 381.1252.

(R,R)-5,5'-dinitro-6,6'-bis(2-octyloxy)thioindigo

A suspension of S5 (153 mg, 0.36 mmol) in a 15% solution of KOH in 1:1 ethanol/H$_2$O (15 ml) was heated to reflux for 5 h. After cooling to room temperature, the mixture was treated with 300 mg of K$_3$[Fe(CN)$_6$] dissolved in H$_2$O (2 ml) and stirred for 1 h. After removing the alcohol in vacuo, the mixture was extracted with CHCl$_3$, and the extracts were washed with H$_2$O, dried (MgSO$_4$) and concentrated to a red solid. Purification by flash chromatography on silica gel (benzene) gave 40 mg (35%) of II as a red solid. The compound was further purified for doping experiments by recrystallization from 15% CHCl$_3$/hexanes: mp 189–190 $^{13}$C; $^1$H NMR (200 MHz, CDCl$_3$) δ 0.88 (t, J=6.6 Hz, 6H), 1.15–1.85 (m, 20H), 1.44 (d, J=6.1 Hz, 6H), 4.66 (m, J=6.0 Hz, 2H), 7.12 (s, 2H), 8.37 (s, 2H); $^{13}$C NMR (50 MHz, CDCl$_1$) δ 14.0, 19.3, 22.5, 25.1, 29.0, 31.6, 36.0, 78.1, 109.0, 120.3, 124.4, 133.1, 139.6, 154.6, 157.6, 186.8; MS (EI) m/e 642 (M$^+$, 1), 418 (100), 388 (4), 372 (5), 359 (2), 326 (2), 253 (2), 208 (4), 165 (16), 111 (26), 83 (59); HRMS (EI) calculated for $C_{32}H_{38}N_2O_8S_2$: 642.2070. Found: 642.2044.

EXAMPLE 3

With reference to FIG. 4, the following method was employed for the synthesis of III. Steps S1 to S10 refer to the steps of the synthesis and correspond to the intermediate compounds employed therein, as indicated in FIG. 4 and in the description below.

General. $^1$H and $^{13}$C NMR spectra were recorded on a Bruker ACF-200 NMR spectrometer in deuterated chloroform or deuterated acetone. The chemical shifts are reported in δ (ppm) relative to tetramethylsilane as internal standard. Low-resolution EI and CI mass spectra were recorded on a Fisons VG Quattro triple quadrupole mass spectrometer; peaks are reported as m/e (% intensity relative to the base peak). High-resolution EI mass spectra were performed by the University of Ottawa Regional Mass Spectrometry Center. UV-visible spectra were recorded on a Varian Cary 3 spectrophotometer in benzene. Melting points were measured on a Mel-Temp II melting point apparatus and are uncorrected.

Materials. All reagents were obtained from commercial sources and used without further purification unless otherwise noted. Dimethylformamide (DMF) was distilled from BaO under reduced pressure and stored over molecular sieves. Methylene chloride (CH$_2$Cl$_2$) was distilled from P$_2$O$_5$ under N$_2$. 4-Methyl-2-nitroanisole was obtained from Aldrich and used without further purification.

2-acetylamino-4-methylanisole (S1)

A solution of 4-methyl-2-nitroanisole (Aldrich) (10 g, 0.06 mol) in 100 ml of absolute ethanol was hydrogenated in the presence of 0.25 g of Pd/C (10%) at room temperature. The catalyst was removed by filtration and the clear solution was concentrated to give 2-amino-4-methylanisole as a white solid. To this solid was added 70 ml of acetic anhydride and a few drops of concentrated sulfuric acid. After stirring for 1 h, the mixture was poured into ice/water and the precipitated product was filtered and dried to give 9.48 g (88%) of S1 as a white solid.

2-acetylamino-4-methyl-5-nitroanisole (S2)

Compound S1 (7 g, 39 mmol) was added in portions to a stirred solution of 24 ml of fuming nitric acid and 100 ml of glacial acetic acid cooled at −18° C. using a salt-ice bath. After stirring for 2 h. the mixture was poured into ice/water and the precipitated product was filtered and dried to give 7.8 g (89%) of S2 as a light yellow powder.

2-amino-4-methyl-5-nitroanisole (S3)

A mixture of S2 (3 g, 1 3.4 mmol) and 20 ml of 10% aq HCl was refluxed for 1 h. The resulting solution was neutralized and then cooled in an ice/water bath. The resulting yellow precipitate was filtered and dried to give 2.1 g (86%) of S3.

2-chloro-4-methyl-5-nitroanisole (S4)

To a solution of S3 (0.5 g, 2.75 mmol) in 5 ml of water and 5 ml of concentrated HCl cooled at 5° C. was added dropwise a solution of 200 mg of NaNO$_2$ in 3 ml of water. The mixture was stirred at 5° C. for 1 h, then poured slowly into a stirred solution of 0.35 g of CuCl in 5 ml of concentrated HCl. After N$_2$ evolution ceased, the precipitate formed was filtered, washed three times with cold water and dried to give 0.45 g (81%) of S4 as a grey-yellow solid.

5-amino-2-chloro-4-methylanisole (S5)

Compound S4 (5.0 g, 24.8 mmol) in 50 ml of methanol was hydrogenated in the presence of 0.25 g of Pd/C (10%) at room temperature. The catalyst was removed by filtration and the clear solution concentrated to give 4.1 g (96%) of S5.

2-chloro-5-fluoro-4-methylanisole (S6)

To a solution of S5 (7.5 g, 43.7 mmol) in 10 ml of water and 10 ml of 45% aq HBF$_4$ was added dropwise a solution of 3.5 g of NaNO$_2$ in 30 ml of water. The precipitated tetrafluoroborate salt was filtered and washed successively with cold water, cold methanol and cold diethyl ether. After drying, the salt was decomposed by heating in 100 ml of toluene under reflux. When the evolution of $BF_3$ ceased, the solution was concentrated to give S6 as a dark viscous oil that was used in the next step without further purification.

5-chloro-2-fluoro-4-methoxybenzoic acid (S7)

Crude S6 (540 mg, 3.1 mmol) was mixed in a solution of 1.3 g of potassium permanganate in 100 ml of water. The mixture was refluxed for 2 h, then filtered hot. The filtrate was cooled in an ice bath and acidified with 2M aq HCl to produce a white precipitate, which was filtered and dried to give 200 mg (35%) of S7 as a white solid.

Methyl 5-chloro-2-fluoro-4-hydroxybenzoate (S8)

A mixture of S7 (627 mg, 3.0 mmol) and 30 mg of the phase transfer catalyst $Ct(Me)_3N^+Br^-$ in 25 ml of 40% aq HBr was refluxed for 8 hours with vigorous stirring. After cooling, the mixture was concentrated to a solid residue, which was mixed with 70 ml of dry methanol and 10–20 drops of concentrated $H_2SO_4$. The mixture was refluxed overnight, then cooled and concentrated. The solid residue was dissolved in ethyl acetate, and the solution was washed with water, then with brine. The organic layer was dried ($MgSO_4$) and the solvent removed in vacuo to give 514 mg (82%) of S8.

Methyl (R)-5-chloro-2-fluoro-4-(2-octyloxy) benzoate (S9)

Under a $N_2$ atmosphere, diisopropylazodicarboxylate (DIAD, 146 mg, 0.72 mmol) was added dropwise to a stirred solution of S8 (98 mg, 0.47 mmol), triphenyl phosphine (189 mg, 0.72 mmol) and (S)-2-octanol (95 mg, 0.72 mmol) in dry $CH_2Cl_2$ (10 ml). After stirring at 25° C. for 2 h, the solvent was removed in vacuo, and the oily residue was purified by flash chromatography on silica gel (30% ethyl acetate/toluene) to give 158 mg (95%) of S9 as an oil.

Methyl (R)-5-chloro-3-hydroxy-6-(2-octyloxy)benzo [b]thio phene-2-carboxylate (S10)

Under a $N_2$ atmosphere, a mixture of S9 (168 mg, 0.53 mmol), anhydrous LiOH (70 mg, 2.9 mmol) and methylthioglycolate (150 mg, 1.4 mmol) in dry DMF (10 ml) was stirred overnight at 25° C. After cooling, the mixture was poured into water (40 ml), acidified with 3M aq HCl and extracted twice with ethyl acetate. The combined extracts were washed with 1M aq HCl, brine, dried and concentrated to give an oily residue. Purification by flash chromatography on silica gel (30% ethyl acetate/toluene) gave 129 mg (66%) of S10 as a clear oil.

(R,R)-5,5'-Dichloro-6,6'-bis(2-octyloxy)thioindigo

A suspension of S10 (110 mg, 0.3 mmol) in a 15% solution of KOH in 1:1 ethanol/$H_2O$ (20 ml) was heated to reflux for 5 h. After cooling, the mixture was treated with 250 mg of $K_3[Fe(CN)_6]$, dissolved in water (3 ml) and stirred for 1 h. After removing the alcohol in vacuo, the mixture was extracted twice with ethyl acetate, and the combined extracts were washed with water, dried and concentrated to give a dark red solid. Purification by flash chromatography on silica gel (30% ethyl acetate/toluene) gave 40 mg (40%) of III as a red solid. The compound was further purified by recrystallization from 95% ethanol in water: mp 103–105° C., $^1H$ NMR (200 MHz, $CDCl_3$) δ 0.87 (t, 6H), 1.23–1.83 (m, 20H), 1.40 (d, 6H), 4.49–4.58 (m, 2H), 6.93 (s, 2H), 7.86 (s, 2H); $^{13}C$ NMR (50 MHz, $CDCl_3$) δ 14.3, 19.7, 22.8, 25.4, 29.3, 31.9, 36.3, 77.0, 108.1, 122.1, 123.3, 128.4, 133.3, 149.8, 160.4, 187.5; MS (EI) m/e 624 (M+4, 1.4), 622 (M+2, 4.8), 620 (M+, 6.3), 400 (20), 398 (76), 396 (100), 258 (12), 226 (47), 213 (10), 171 (23), 149 (88). High-resolution MS calculated for $C_{32}H_{38}Cl_2S_2O_4$; 620.1593. Found: 620.1591.

It should be noted that in the above synthetic procedure, the conversion from intermediate S9 to intermediate S10, i.e., the conversion from a monocyclic to a bicyclic system, must be done under basic conditions. This is because the secondary alkoxy side chain is very acid-sensitive. If acid conditions were employed, the optically active center would racemize. Thus, both the conversion from S9 to S10 and from S10 to III are performed under basic conditions. Similar procedures are employed for analogues or derivatives of III according to the invention.

Figure 5:
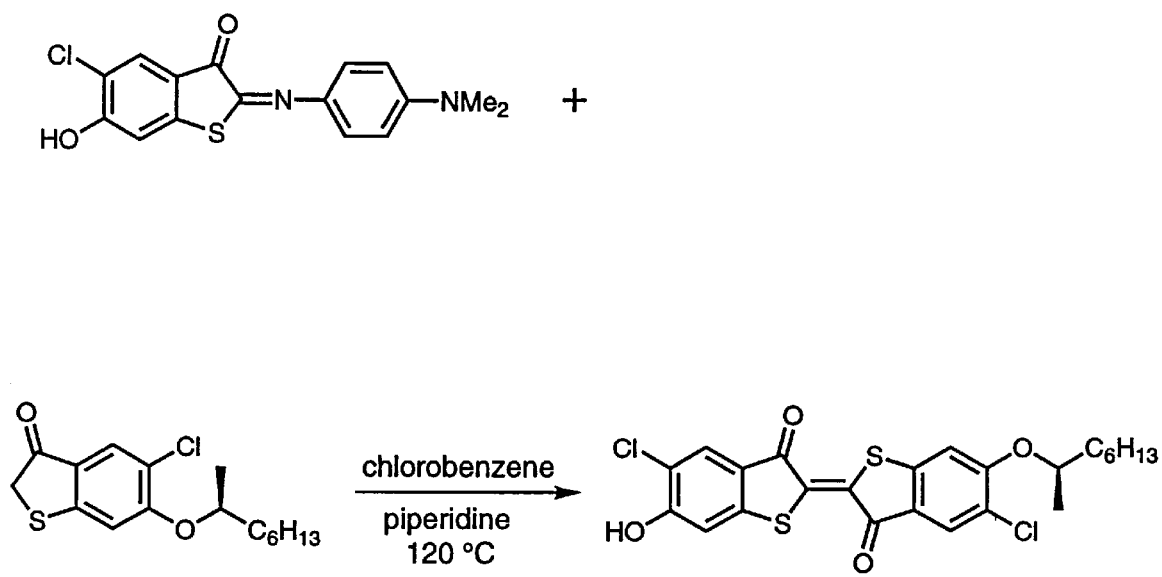
FIG. 5 is a diagram of a synthetic process for a chloro-substituted unsymmetrical chiral thioindigo dopant according to the invention.

Unsymmetrical chiral thioindigo dopants and components of general formula I can be synthesized according to the cross-coupling reaction shown in FIG. 5. This reaction is a key step in the synthesis of chiral thioindigo oligosiloxane side-chain dopants such as V according to the invention. The synthesis shown in FIG. 5 is based on the procedure described by Wakemoto et al. in European Patent Application No. 86103922.0, published on Oct. 29, 1986, which procedure was used to synthesize achiral unsymmetrical thioindigo compounds. FIG. 5 shows a specific example of a chloro-substituted unsymmetrical chiral thioindigo compound.

EXAMPLE 4

In accordance with the invention, there is provided an approach for preparing thioindigo-doped polymeric liquid crystals that undergo $P_S$ or $e_c$ photomodulation. The approach involves synthesizing a chiral thioindigo compound of general formula I but having an oligosiloxane side-chain, as shown in formula V, and introducing such compound as a dopant into a side-chain polysiloxane or oligosiloxane $S_C$ or $S_A$ host.

Appending an oligosiloxane side-chain onto a thioindigo dopant, as in general formula V, requires that one of the chiral side-chains of the thioindigo be a terminal alkene such as, for example, that shown in formula IVf. The chiral side-chain can be appended to the oligosiloxane structure via, for example, standard hydrosilation chemistry.

EXAMPLE 5

A light switch according to the invention was demonstrated using the following procedure:

In a 0.4 ml Reacti-Vial were mixed 0.524 mg of III, 0.152 mg of (S,S)-4,4'-bis[(2-chloro-3-methylbutanoyl)oxy] biphenyl and 13.46 mg of PhBz to give a homogeneous material. A cell consisting of two polyimide-coated glass slides with an indium/tin oxide-coated addressed area of 0.25 $cm^2$ and a spacing of 3.5 $\mu$m was filled by capillary action with the above liquid crystal mixture at a temperature of 120° C. (cell purchased from Displaytech, Inc., Longmont, Colo.). The cell containing the above mixture (hereinafter FLC cell) was then placed in a Instec HS1-i microscope hot stage with the addressed area fully exposed through the aperture and heated to 80° C., which is above the clearing point of the liquid crystal phase. The sample was then cooled to 71° C., which is just above the $S_{C*}$–$S_{A*}$ transition temperature, at a rate of 1° C./min. The sample was held at that temperature for 3 hours in order to align the liquid crystal material, and then cooled to 60° C. at a rate of 2° C./min, which is 10° C. below the $S_{C*}$–$S_{A*}$ transition temperature. (T-$T_{AC}$=-10° C.). The sample was then annealed at 60° C. overnight. Throughout this entire operation, a triangular AC voltage was maintained across the cell (100 Hz, 20V).

Figure 8:
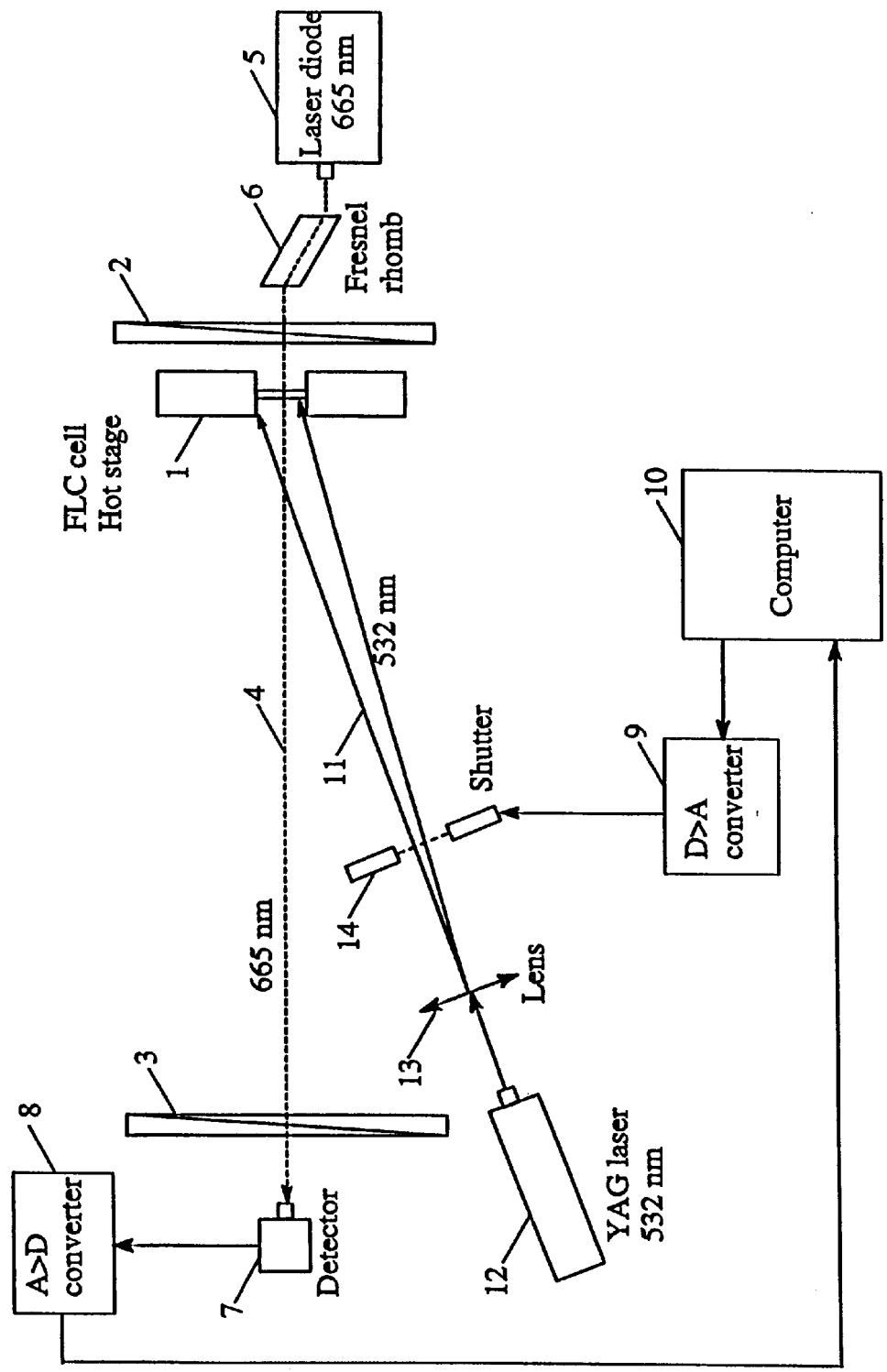
FIG. 8 is a diagram of an apparatus used to demonstrate a FLC optical switch according to the invention.

With reference to FIG. 8, the FLC cell/hot stage assembly 1 was positioned vertically between two crossed polarizers 2, 3, and a constant DC voltage of 17 V was maintained across the cell throughout the experiment. The temperature of the sample was maintained at T-$T_{AC}$=-10° C. A circularly polarized reading beam 4 at 665 nm was generated from a 5 mW diode laser 5 using a Fresnel rhomb 6, and the beam 4 was aligned in such a way as to pass through the addressed area of the FLC cell 1. The FLC sample does not absorb 665 nm light. The crossed polarizers 2, 3 were aligned in such a way as to minimize the transmission of the reading beam 4 through the FLC cell/polarizers assembly. A photodiode detector 7 interfaced to a computer 10 via an analogue-to-digital converter 8 was used to measure the intensity of the reading beam 4 through the FLC cell/polarizers assembly. A writing beam 11 at 532 nm was generated from a 50 mW Nd:YAG laser 12, and the beam 11 was aligned through a lens 13 to irradiate the FLC cell 1 as shown in FIG. 7. The writing beam 11 was turned ON and OFF by a shutter 14 controlled by the computer 10 via a digital-to-analogue converter 9.

Figure 9:
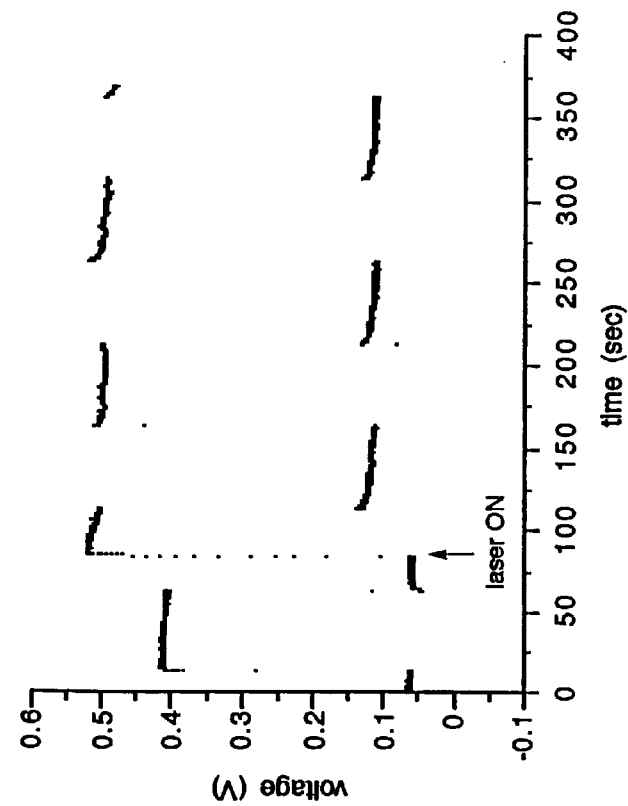
FIG. 9 shows a change in transmission of a light beam through a FLC optical switch under a DC field, upon irradiation by an addressing wavelength at 532 nm, indicated by a change in voltage as a function of time.

In a typical experiment, the writing beam 11 was turned ON for 2.5 seconds and the transmission of the reading beam 4 through the FLC cell/polarizers assembly was measured as a function of time, as shown in FIG. 9. The results show an increase in transmission upon irradiation of the FLC cell at 532 nm. The transmission level of the reading beam 4 returned to its original value about 150 seconds after the writing beam 11 was turned OFF, as a result of thermal relaxation of the thioindigo dopant from the cis form back to the trans form.

Figure 10:
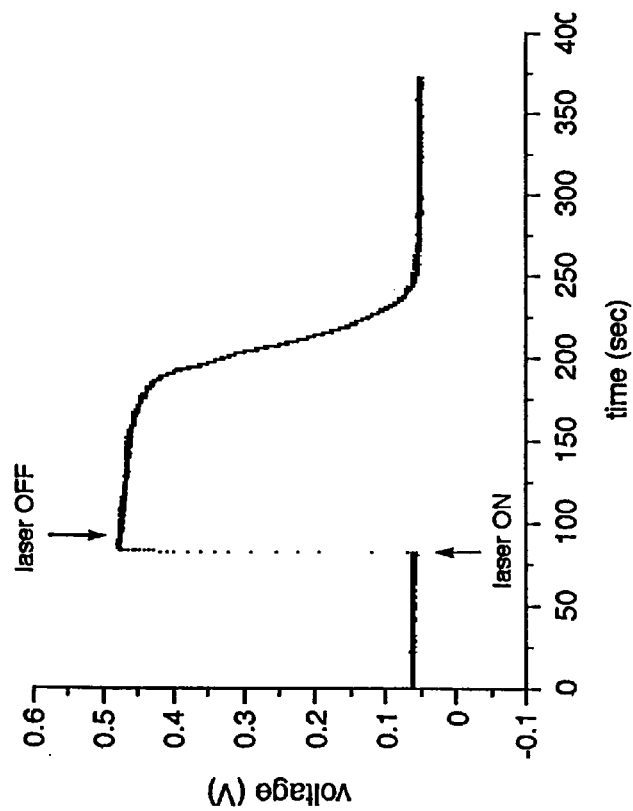
FIG. 10 shows changes in transmission of a light beam through a FLC optical switch under a square wave AC field, upon irradiation by an addressing wavelength at 532 nm, indicated by changes in voltage as a function of time.

To show that the observed change in transmission of the reading beam is caused by photoinduced Goldstone-mode switching of the FLC cell, the above experiment was repeated using a square wave AC voltage (17 V, 0.01 Hz). Under these conditions, Goldstone-mode switching is field-induced instead of photoinduced. As shown in FIG. 10, when the FLC cell is in the dark, electric field reversal causes an increase in transmission that is about 20% less than that shown in FIG. 9. When the FLC cell is under constant irradiation at 532 nm, electric field reversal causes the same net change in transmission, but with an upward baseline shift. The overall change in transmission from the low transmission level in the dark to the high transmission level under constant irradiation is approximately equal to that shown in FIG. 9, thus confirming the occurrence of photoinduced Goldstone-mode FLC switching. The response time corresponding to a 90% change in transmission is 0.5 seconds at T-$T_{AC}$=-10° C. in this experiment.

Those skilled in the art will recognize, or be able to ascertain through routine experimentation, equivalents to the specific embodiments described herein. Such equivalents are considered to be within the scope of the invention and are covered by the appended claims.

We claim:

1. A method of modulating a chiral bulk property of a chiral smectic liquid crystal phase of a ferroelectric liquid crystal (FLC), comprising;

(a) doping a smectic liquid crystal host with a chiral thioindigo compound having a chiral side-chain at one or both of positions 6 and 6', a chiral center of at least one of said chiral side chains being coupled, via steric and/or dipole-dipole interactions, to the thioindigo core; and (b) irradiating the FLC with light at a wavelength in the visible range so that a chiral bulk property is modulated;

wherein said modulation of the chiral bulk property does not destabilize the chiral smectic liquid crystal phase.

2. A method according to claim 1, wherein the modulation is effected by trans-cis photoisomerization of the chiral thioindigo compound upon irradiation.

3. A method according to claim 2, wherein the chiral thioindigo compound exhibits: reversible photoisomerization; absorptivity of the cis and trans isomers at different wavelengths so that the two isomers can be addressed at different wavelengths; and absorptivity of the cis and trans isomers in the visible range.

4. A method according to claim 1, wherein the wavelength is within the range of about 400 nm to about 800 nm.

5. A method according to claim 1, wherein the chiral thioindigo compound is of the general formula I:

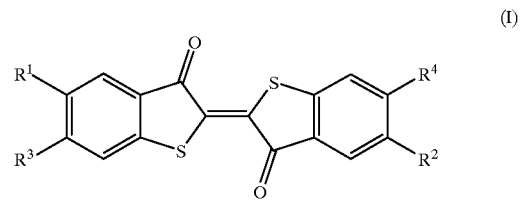

wherein $R^1$ and $R^2$ may be the same or different from each other and are selected from the group consisting of hydrogen, fluoro, chloro, bromo, iodo, nitro, nitrile, alkyl, alkenyl, alkoxy, hydroxy, perfluoroalkyl, and thioalkyl; and $R^3$ and $R^4$ may be the same or different from each other and at least one of $R^3$ and $R^4$ is selected from the group consisting alkyl alkenyl, ether, epoxide, ester, carbonyl, amide, aromatic, heterocyclic, halide, and nitrile.

6. A method according to claim 3, wherein the compound is (R,R)-5,5'-dinitro-6,6'-bis(2-octyloxy)thioindigo, or a derivative or analogue thereof.

7. A method according to claim 3, wherein the compound is (R,R)-5,5'-dichloro-6,6'-bis(2-octyloxy)thioindigo, or a derivative or analogue thereof.

8. A method according to claim 5, wherein one of $R^3$ and $R^4$ is an oligosiloxane side-chain, and the other of $R^3$ and $R^4$ is said chiral side-chain with at least one chiral center that is coupled, via steric and/or dipole-dipole interactions, to the thioindigo core.

9. A method according to claim 1, wherein the liquid crystal host is selected from the group consisting of an achiral smectic C($S_C$) liquid crystal host, and a chiral smectic C($S_C$*) liquid crystal host.

10. A method according to claim 9, wherein the compound modulates a spontaneous polarization of the liquid crystal phase upon irradiation in the visible range.

11. A method according to claim 1, wherein the liquid crystal host is selected from the group consisting of an achiral smectic A($S_A$) liquid crystal host and a chiral smectic A($S_A$*) liquid crystal host.

12. A method according to claim 11, wherein the compound modulates an electroclinic coefficient of the liquid crystal phase upon irradiation in the visible range.

13. A method according to claim 1, wherein the liquid crystal host is selected from the group consisting of a polymeric smectic C($S_C$) liquid crystal host and a polymeric smectic A($S_A$) liquid crystal host.

14. A method according to claim 13, wherein the liquid crystal host is selected from the group consisting of a polysiloxane smectic C($S_C$) liquid crystal host and a polysiloxane smectic A($S_A$) liquid crystal host.

15. An optical device for operation with a direct current field, comprising:

a liquid crystal host selected from the group consisting of an achiral smectic C($S_C$) liquid crystal host and a chiral smectic C($S_C$*) liquid crystal host; and a chiral thioindigo compound having a chiral side-chain at one or both of positions 6 and 6', a chiral center of at least one of said chiral side chains being coupled, via steric and/or dipole-dipole interactions, to the thioindigo core, the chiral thioindigo compound being dispersed in the liquid crystal host to produce a chiral smectic C($S_C$*) liquid crystal phase across which the field is applied, the chiral thioindigo compound, upon irradiation in the visible range, modulating a spontaneous polarization of the liquid crystal phase without destabilization of the liquid crystal phase.

16. An optical device according to claim 21, wherein the chiral thioindigo compound is of the general formula I,

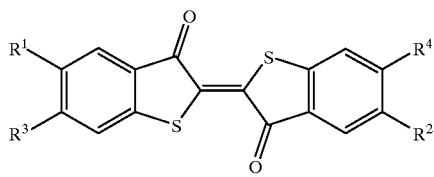

(I)

wherein $R^1$ and $R^2$ may be the same or different from each other and are selected from the group consisting of hydrogen, fluoro, chloro, bromo, iodo, nitro, nitrile, alkyl, alkenyl, alkoxy, hydroxy, perfluoroalkyl, and thioalkyl; and $R^3$ and $R^4$ may be the same or different from each other and at least one of $R^3$ and $R^4$ is selected from the group consisting alkyl alkenyl, ether epoxide, ester, carbonyl, amide, aromatic, heterocyclic, halide, and nitrile.

17. An optical device according to claim 16, wherein one of $R^3$ and $R^4$ is an oligosiloxane side-chain, and the other of $R^3$ and $R^4$ is said chiral side-chain with at least one chiral center that is coupled, via steric and/or dipole-dipole interactions, to the thioindigo core.

18. An optical device for operation with a direct current field, comprising:

a liquid crystal host selected from the group consisting of an achiral smectic C($S_A$) liquid crystal host and a chiral smectic C($S_A$*) liquid crystal host; and a chiral thioindigo compound having a chiral side-chain at one or both of positions 6 and 6', a chiral center of at least one of said chiral side chains being coupled, via steric and/or dipole-dipole interactions, to the thioindigo core, the chiral thioindigo compound being dispersed in the liquid crystal host to produce a chiral smectic C($S_A$*) liquid crystal phase across which the field is applied, the chiral thioindigo compound, upon irradiation in the visible range, modulating an electroclinic coefficient of the liquid crystal phase without destabilization of the liquid crystal phase.

19. An optical device according to claim 18, wherein the chiral thioindigo compound is of the general formula I:

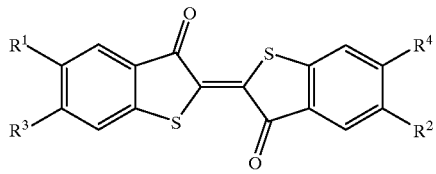

(I)

wherein $R^1$ and $R^2$ may be the same or different from each other and are selected from the group consisting of hydrogen, fluoro, chloro, bromo, iodo, nitro, nitrile, alkyl, alkenyl, alkoxy, hydroxy, perfluoroalkyl, and thioalkyl; and $R^3$ and $R^4$ may be the same or different from each other and at least one of $R^3$ and $R^4$ is selected from the group consisting alkyl, alkenyl, ether, epoxide, ester, carbonyl, amide, aromatic, heterocyclic, halide, and nitrile.

20. An optical device according to claim 19, wherein one of $R^3$ and $R^4$ is an oligosiloxane side-chain, and the other of $R^3$ and $R^4$ is said chiral side-chain with at least one chiral center that is coupled, via steric and/or dipole-dipole interactions, to the thioindigo core.

21. An optical device according to claim 15, wherein the device is an optical switch.

22. An optical device according to claim 18, wherein the device is an optical switch.

23. An FLC optical switch for operation tinder a direct current field, comprising:

a smectic C liquid crystal host;

a chiral photochromic compound dispersed in the liquid crystal host, the chiral compound inducing in the liquid crystal host polarization in a first polarity, and being capable of undergoing trans-cis isomerization upon irradiation in the visible range without destabilizing the liquid crystal; and a photochemically inert compound dispersed in the liquid crystal host, the inert compound inducing in the liquid crystal polarization in a second polarity;

wherein the proportions of the chiral compound and the inert compound are such that the polarization induced by the inert compound is greater than that induced by a first isoform of the photochromic dopant, such that the total polarization of the liquid crystal is in the second polarity; and wherein upon irradiation in the visible range the polarization induced by the inert compound is less than that induced by the photochromic dopant in a second isoform, such that the total polarization of the liquid crystal is in the first polarity, resulting in a change in light transmission through the liquid crystal.

24. A chiral bicyclic enol ester selected from the group consisting of:

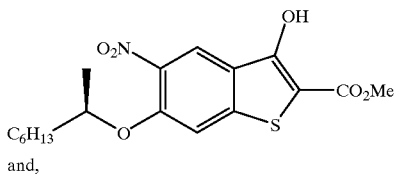

and,

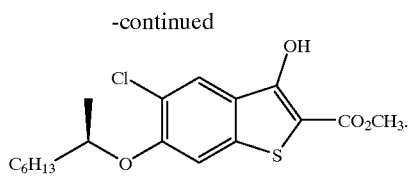
25. A method for synthesizing the chiral bicyclic enol ester of claim 24, comprising the steps of:
   conducting a Mitsunobu inversion reaction to produce a chiral methyl 2-fluorobenzoate precursor;
   reacting the chiral methyl 2-fluorobenzoate precursor with methyl thioglycolate to produce the chiral bicyclic enol ester.
* * * * *

UNITED STATES PATENT AND TRADEMARK OFFICE
CERTIFICATE OF CORRECTION

PATENT NO. : 5,989,451

DATED : November 23, 1999

INVENTOR(S) : Robert P. Lemieux and Liviu Dinescu

It is certified that error appears in the above-identified patent and that said Letters Patent is hereby corrected as shown below:

Claim 1, column 19, line 60, delete "ferroelectric".

Claim 1, column 19, line 61, delete "(FLC)".

Claim 1, column 20, line 1, after "irradiating the", insert --chiral smectic liquid crystal phase--.

Claim 1, column 20, line 1, delete "FLC".

Claim 5, column 20, line 34, replace "is" with --has a functionality--.

Claim 5, column 20, line 35, after "consisting", insert --of--.

Claim 16, column 21, line 20, replace "claim 21" with --claim 15--.

Claim 16, column 21, line 40, replace "is" with --has a functionality--.

UNITED STATES PATENT AND TRADEMARK OFFICE
CERTIFICATE OF CORRECTION

Page 2 of 2

PATENT NO. : 5,989,451
DATED : November 23, 1999
INVENTOR(S) : Robert P. Lemieux and Liviu Dinescu It is certified that error appears in the above-identified patent and that said Letters Patent is hereby corrected as shown below:

Claim 16, column 21, line 41, after "consisting", insert --of--.

Claim 18, column 21, line 52, replace "$C(S_A)$" with --$A(S_A)$--.

Claim 18, column 21, line 53, replace "$C(S_A^*)$" with --$A(S_A^*)$--.

Claim 18, column 21, line 60, replace "$C(S_A^*)$" with --$A(S_A^*)$--.

Claim 19, column 22, line 18, replace "is" with --has a functionality--.

Claim 19, column 22, line 19, after "consisting", insert --of--.

Signed and Sealed this

Seventeenth Day of October, 2000

*Attest:*

Q. TODD DICKINSON

*Attesting Officer*   Director of Patents and Trademarks